United States Patent [19]

Heymann et al.

[11] Patent Number: 5,689,422
[45] Date of Patent: Nov. 18, 1997

[54] CONVERTER FOR CRUISE CONTROL SYSTEM

[75] Inventors: Michael Heymann; Arie Feuer, both of Haifa, Israel

[73] Assignee: Technion Research and Development Foundation Ltd., Haifa, Israel

[21] Appl. No.: 423,359

[22] Filed: Apr. 18, 1995

[30] Foreign Application Priority Data

Apr. 18, 1994 [IL] Israel ........................ 109332

[51] Int. Cl.[6] .................. B60K 31/04; G08G 1/16; G01S 13/60
[52] U.S. Cl. ............. 364/426.041; 364/426.044; 364/460; 364/461; 340/903; 340/435; 367/99; 180/170
[58] Field of Search ............ 364/426.04, 426.05, 364/431.07, 460, 461, 456, 426.044; 180/170, 179, 169; 367/91, 99, 118; 340/902, 903, 435

[56] References Cited

U.S. PATENT DOCUMENTS

| | | | |
|---|---|---|---|
| 4,622,636 | 11/1986 | Tachibana | 364/426.04 |
| 5,091,726 | 2/1992 | Shyu | 340/904 |
| 5,197,562 | 3/1993 | Kakinami et al. | 340/435 |
| 5,215,159 | 6/1993 | Nishida | 180/179 |
| 5,230,400 | 7/1993 | Kakinami et al. | 180/169 |
| 5,493,302 | 2/1996 | Woll et al. | 342/71 |
| 5,510,990 | 4/1996 | Hibino et al. | 364/426.04 |
| 5,529,139 | 6/1996 | Kurahashi et al. | 364/426.04 |

*Primary Examiner*—Kevin J. Teska
*Assistant Examiner*—Tan Nguyen
*Attorney, Agent, or Firm*—Browdy and Neimark

[57] ABSTRACT

A converter for use with a constant speed vehicle cruise control system including a speedometer for generating a self speed signal representative of the self speed of the vehicle and a speed adjustment control responsively coupled to the speedometer for maintaining the self speed of the vehicle at a preset speed. The converter adapts the control system to a constant distance system, and comprises a rangefinder for generating a distance signal corresponding to the distance of the vehicle from a front vehicle, and a distance-dependent speed adjustment device coupled to the rangefinder and to the speedometer for generating a synthetic-speed signal corresponding to the set speed required for maintaining a predetermined distance between the two vehicles. A selector switch allows either the self speed or synthetic-speed signals to be connected to the speedometer of the cruise control system.

10 Claims, 5 Drawing Sheets

CONVERTER FOR CRUISE CONTROL SYSTEM

FIELD OF THE INVENTION

This invention relates to cruise control systems for use with motor vehicles.

BACKGROUND OF THE INVENTION

Cruise control systems are devices which automatically maintain a constant road speed set by the driver of a motor vehicle. All such devices include a speed adjustment device responsive to a difference between the measured self speed of the vehicle and a desired cruising speed for adjusting the speed of the vehicle. The adjustment is performed by adjusting the fuel intake to the carburetor.

U.S. Pat. No. 5,230,400 (Kakinami et al.) discloses such a cruise control system further including a rangefinder for measuring the inter-vehicle separation from an advance vehicle. A circuit sets upper and lower distance thresholds and upper and lower speed thresholds in accordance with the actual self speed of the vehicle and the inter-vehicle distance, these being measured at the instant the cruise control is initiated.

The actual self speed of the vehicle is controlled so that when it is smaller than the lower speed threshold, the actual self speed of the vehicle is increased. When the actual self speed of the vehicle is greater than the upper speed threshold, the actual self speed of the vehicle is decreased. When inter-vehicle distance is smaller than the lower distance threshold, the actual speed of the vehicle is decreased and, likewise, when the inter-vehicle distance is greater than the upper distance threshold, the self speed of the vehicle is increased. When the self speed of the vehicle lies between the upper and lower speed thresholds and the inter-vehicle distance lies between the upper and lower distance thresholds, no change is effected to the actual self speed of the first vehicle.

In effect a boundary is defined within which the actual speed of the first vehicle and its distance from the second vehicle are constrained. However, in practice, it will be realized that the inter-vehicle distance and the actual self speed of the first vehicle are not independent variables and are not therefore susceptible to independent control. Consequently, the system disclosed by Kakinami et al. would appear to be limited in scope to specific boundary conditions only.

U.S. Pat. No. 5,197,562 (Hida et al.) discloses a cruise control system further including a rangefinder for measuring the inter-vehicle separation from an advance vehicle. A conventional detecting device is included for detecting the current speed of the vehicle there being also provided a device for measuring the inter-vehicle distance between the two vehicles. A separate device is provided for maintaining the inter-vehicle distance at a predetermined distance based on the degree of danger determined by the relationship of the current inter-vehicle distance and the speeds of the two vehicles.

The distance maintaining device and the speed maintaining device are two separate virtual modules which are selectably switchable so that either can be selected. If the distance maintaining device is activated, then the speed maintaining device ceases to be effective. Conversely, if the speed maintaining device is activated then it performs in its normal manner without attempting to maintain a desired inter-vehicle distance.

Cruise control systems of the kind disclosed by Hida et al. would generally be custom designed for a specific type of vehicle as a comprehensive unit, receiving as input signals a speed measurement and an inter-vehicle distance measurement and producing as output an adjustment signal for adjusting the fuel intake of the vehicle. Furthermore, such systems would be installed at the factory by the vehicle manufacturer.

It would be desirable to adapt an existing cruise control system, that has been designed to maintain a constant speed only, so as to confer the advantages proposed by Hida et al. within a single uniform system. Such a facility is particularly desirable in congested traffic conditions when, more important than maintaining constant the self speed of the vehicle, is the need to maintain a safe distance between a vehicle and the one in front.

SUMMARY OF THE INVENTION

It is an object of the invention to provide a converter for use with a conventional cruise control system so as to render it capable of maintaining a constant inter-vehicle distance.

According to a broad aspect of the invention there is provided for use with a vehicle cruise control system, comprising:

self speed setting means for specifying the required set speed of the vehicle, self speed determination means for determining a self speed of the vehicle and generating a corresponding self speed signal, and speed adjustment means coupled to the self speed determination means and responsive to the self speed signal for maintaining the self speed of the vehicle at the required set speed;

a converter for converting the control system to a constant distance system, the converter comprising:

a rangefinder for determining a distance of said vehicle from a front vehicle and generating a corresponding distance signal, and distance-dependent speed adjustment means coupled to the rangefinder and to the self speed determination means for determining a required set speed for maintaining a predetermined distance between the two vehicles and generating a corresponding synthetic-speed signal, and a selector means having first and second inputs respectively connected to the self speed signal and the synthetic-speed signal and having an output connected to the speed adjustment means of the cruise control system, for selectively coupling one of said inputs to said output.

It will thus be seen that the converter according to the invention is a self-contained device and is very simply connected to an existing cruise control system merely by replacing the speed measurement signal which normally drives the cruise controller by a synthetic signal generated by the converter. Consequently, the device is easily installed without specialized skills or equipment.

BRIEF DESCRIPTION OF THE DRAWINGS

In order to understand the invention and see how the same may be carried out in practice, some preferred embodiments will now be described, by way of non-limiting example only, with reference to the accompanying drawings, in which.

DETAILED DESCRIPTION OF PREFERRED EMBODIMENTS

Figure 1:
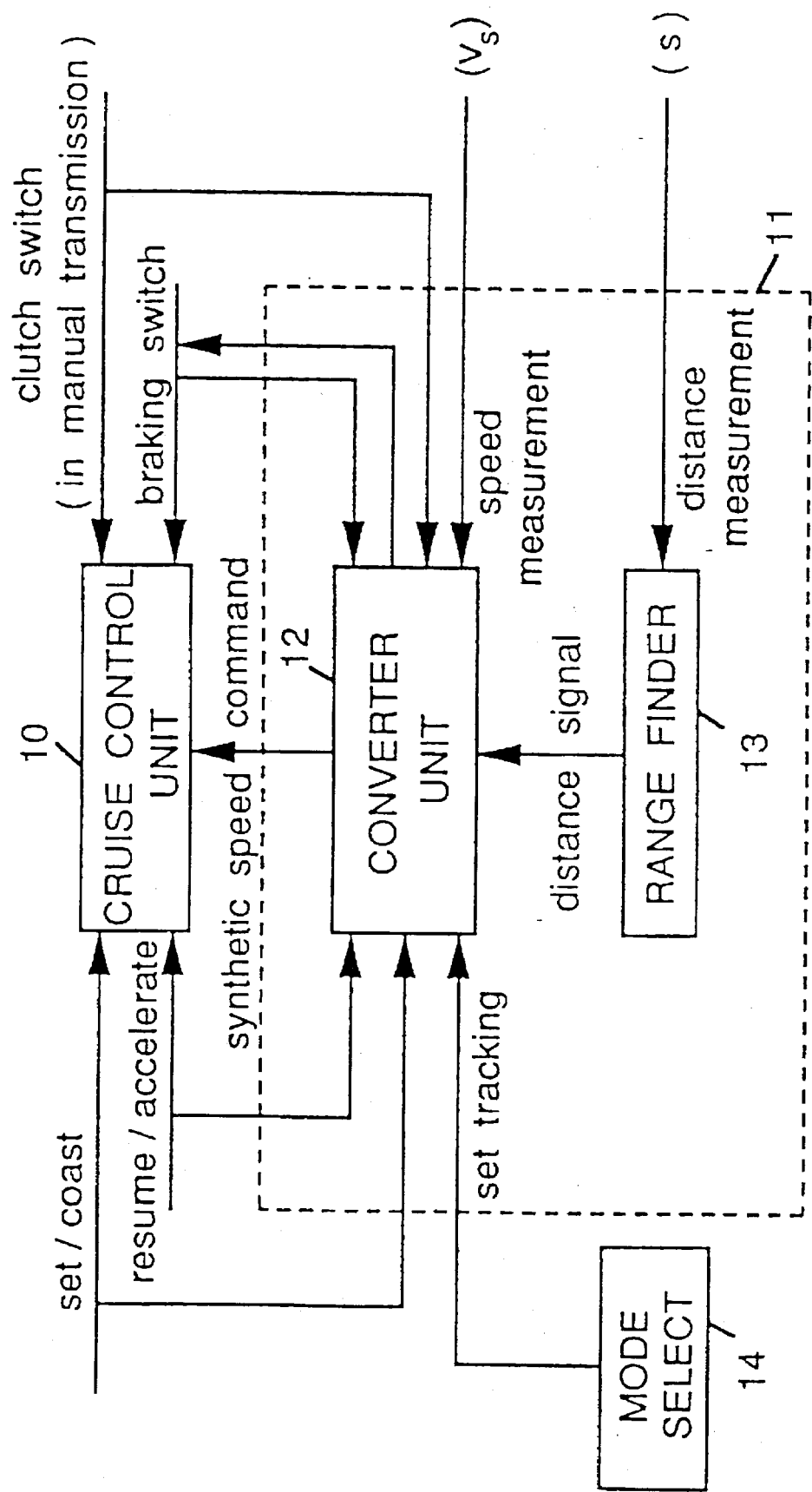
FIG. 1 is a block diagram showing functionally a modified cruise control unit having connected thereto a converter according to the invention.

Referring to FIG. 1 there is shown a cruise control unit depicted generally as 10 responsive to a variety of control signals whose derivation is not a feature of the invention. The control signals comprise a set/coast control signal, a resume/accelerate control signal, a braking switch control signal and, for manual transmission vehicles, a clutch switch control signal. The Cruise Control Unit 10 is further responsive to a speed signal representative of the vehicle's road speed. In use, the Cruise Control Unit 10 is responsive to the speed signal at the moment that the set/coast control signal is applied for maintaining the vehicle's road speed at that value until the resume/accelerate signal, the braking switch signal or the clutch switch signal is applied. Thereafter, re-application of the resume/accelerate signal causes the Cruise Control Unit 10 to maintain the original set speed of the vehicle.

Cruise control systems of the kind described are suitable primarily for long distance travel in uncongested road conditions. They are not suitable for urban traffic conditions on congested highways where vehicles travel nose-to-tail. Such congested traffic conditions demand that a relatively constant inter-vehicle distance be maintained and the self speed of the vehicle is not itself important.

Also shown coupled to the Cruise Control Unit 10 is a Converter designated generally as 11 and comprising a Converter Unit 12 responsively coupled to a rangefinder 13. The rangefinder 13 measures the inter-vehicle distance from the vehicle containing the Cruise Control Unit 10 to a leading vehicle (constituting a front vehicle) so as to produce a corresponding distance signal. The distance signal is fed to the Converter Unit 12 as are the set/coast, resume/accelerate, braking switch and clutch switch control signals fed to the Cruise Control Unit 10. The speed measurement signal normally fed to the Cruise Control Unit 10 is fed, instead, to the Converter Unit 12.

A suitably mounted mode select switch 14 is provided for selecting either a "tracking" or "cruise" mode of operation. When "tracking" mode is selected, a tracking select signal is produced and fed to the Converter Unit 12. The Converter Unit 12 is responsive to the distance signal, to the speed measurement signal and to the tracking select signal for feeding either the original speed measurement signal to the Cruise Control Unit 10 or, alternatively, a modified speed signal for maintaining a substantially constant inter-vehicle distance. When the mode select switch 14 is set to "cruise" mode, the conventional speed measurement signal is fed directly by the Converter Unit 12 to the Cruise Control Unit 10 which operates in conventional manner.

Figure 2:
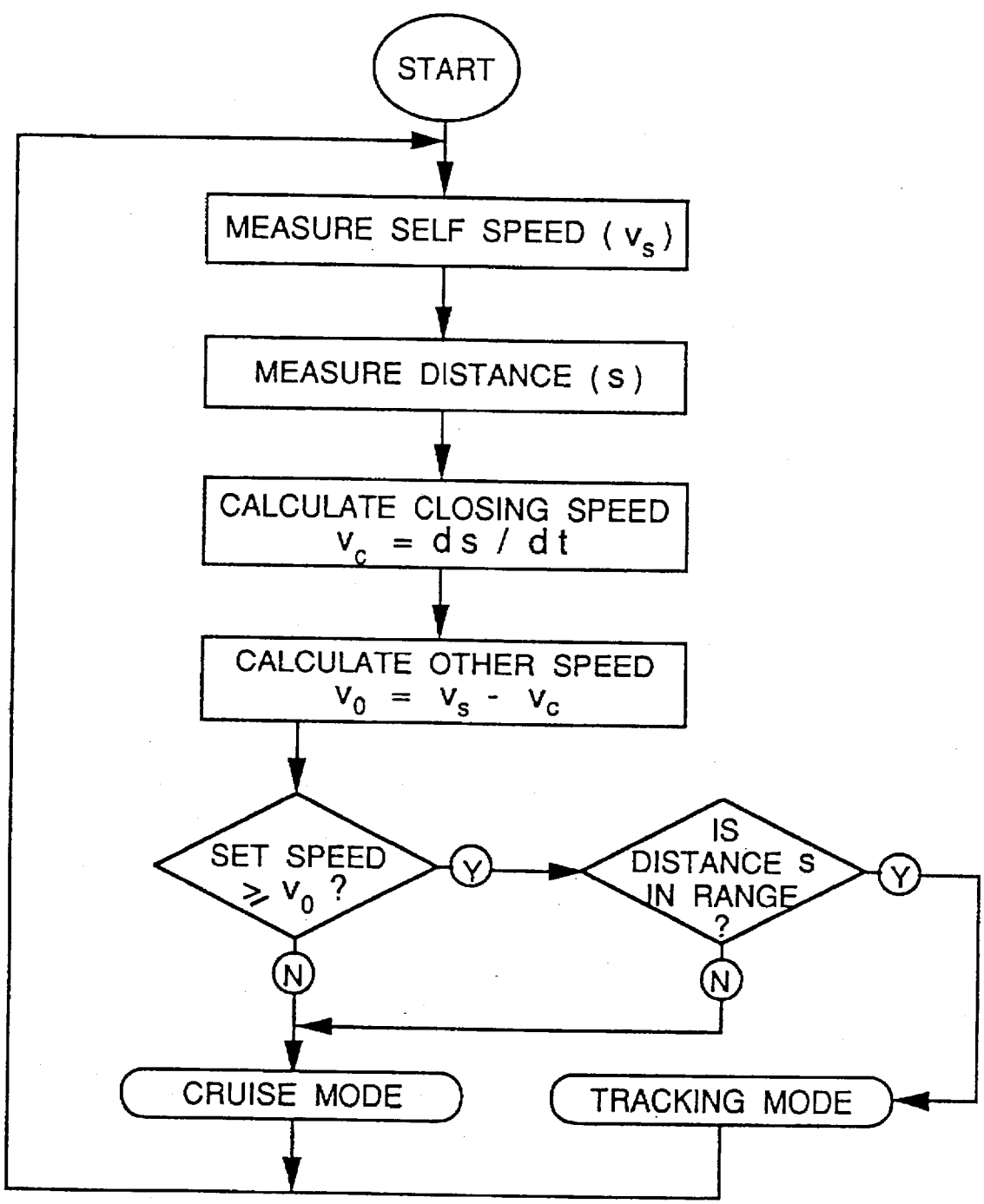
FIG. 2 is a flow diagram showing the principal switching control steps for selecting cruise (i.e. speed maintaining) or tracking (i.e. distance maintaining) control in the converter shown in FIG. 1.

FIG. 2 is a flow diagram showing the operation of the Converter Unit 12 when the mode select switch 14 is set to the "tracking mode". Under these conditions, the vehicle's self speed $v_s$ and the inter-vehicle distance s are measured and the closing speed between the vehicle containing the Cruise Control Unit 10 and a front vehicle is calculated as the approximate time derivative of the measured distance s. This permits calculation of the road speed of the front vehicle in accordance with the formula:

$$v_c = ds/dt$$

$$v_o = v_s - v_c$$

If the set speed is less than the calculated road speed of the front vehicle, then there is no danger that the vehicle containing the Cruise Control Unit 10 will catch up with the front vehicle and, in this condition, the regular cruise mode is operative. However, if the set speed is not less than the road speed of the front vehicle, then the measured distance s is compared with lower and upper distance thresholds and, for so long as the measured distance s lies within the two thresholds, the "tracking mode" becomes operative wherein a substantially constant inter-vehicle distance is maintained.

Clearly, if the measured distance s exceeds the upper distance threshold, this implies that there is so large a gap between the two vehicles that there is no need to maintain such a large inter-vehicle distance and, in this case, the regular cruise mode may be allowed to continue even though this will result in the inter-vehicle distance becoming progressively smaller.

Conversely, if the inter-vehicle distance s is smaller than the low distance threshold, as might be the case in heavily congested road conditions such as traffic jams, then there is also no merit in automatically maintaining a constant inter-vehicle distance, since this could merely invite tail-gating. In this case, the Converter Unit 12 generates a disabling signal for automatically disabling the Cruise Control Unit 10 since maintaining a safe inter-vehicle distance is best achieved manually by the driver. The disabling signal performs the same function as the braking signal which is produced by applying the brakes and permits the Converter Unit 12 to be tapped to the braking switch, as seen in FIG. 1.

While in the tracking mode, the vehicle will move at a speed which is the lesser of the pre-set cruising speed and the speed of the front vehicle. When the vehicle moves at the speed of the front vehicle, the inter-vehicle distance which is to be maintained can be chosen to be either constant (and equal to the inter-vehicle distance when the tracking mode was activated) or a speed-dependent safe distance that is computed automatically by the Converter Unit 12. In the tracking mode, the Converter Unit 12 transmits to the Cruise Control Unit 10 a modified speed control signal which replaces speed measurement signal $v_s$.

Figure 3:
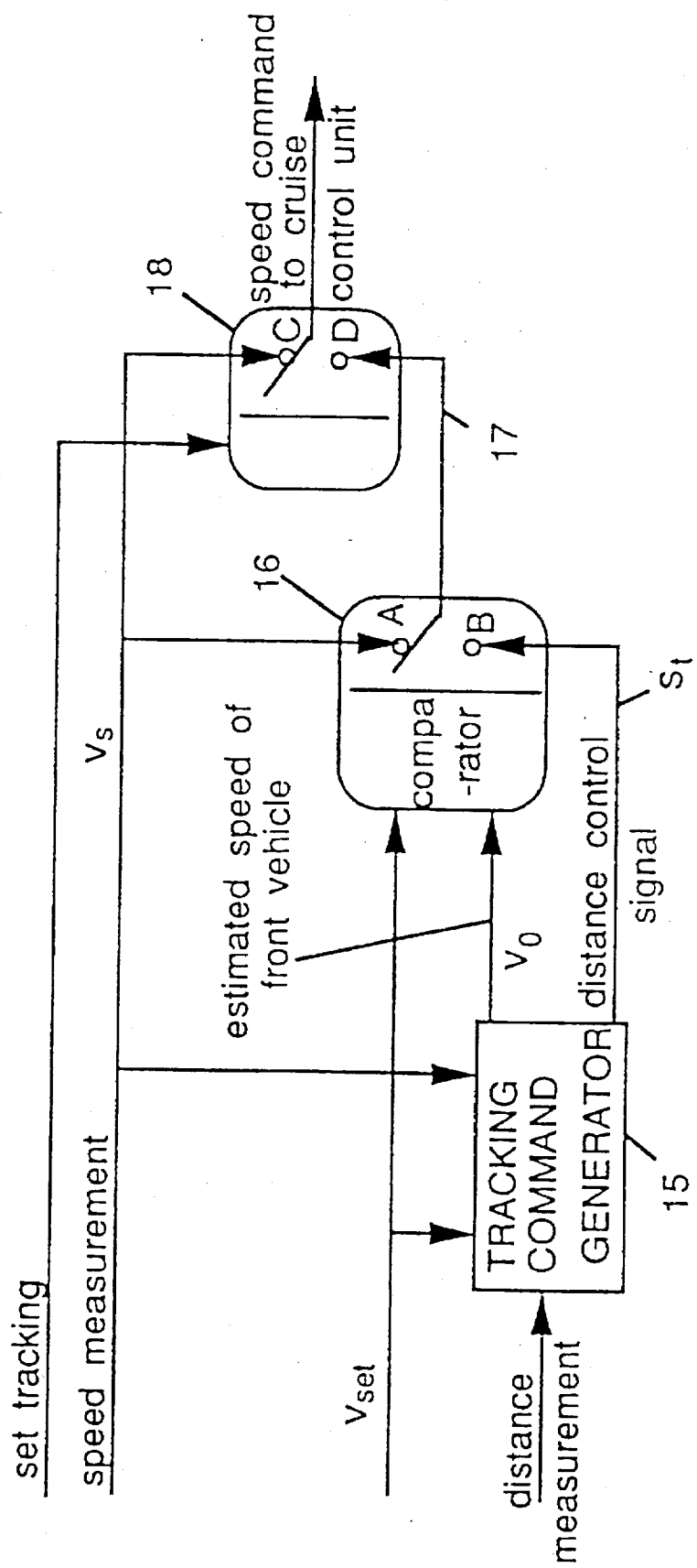
FIG. 3 is a block diagram showing the connection of a Tracking Command Generator in the converter of FIG. 1.

Reference is now made to FIG. 3 which shows schematically a connection of a Tracking Command Generator 15 for use with the Converter Unit 12 shown in FIG. 1 and which maintains constant inter-vehicle distance. The Tracking Command Generator 15 computes the estimated speed of the front vehicle $v_o$ in accordance with the logic described above with reference to FIG. 2 of the drawings. The computed speed $v_o$ as well as the desired set speed $v_{SET}$ are fed to a comparator 16 having an output 17 which is set to the vehicle's self speed $v_s$ if the estimated speed of the front vehicle $v_o$ is greater than the set speed $v_{SET}$, and is set to a modified distance control signal $s_t$ generated by the Tracking Command Generator 15 if the estimated speed of the front vehicle $v_o$ is smaller than or equal to the set speed $v_{SET}$. The output 17 of the comparator 16 is fed to a selector switch 18 for connecting the measured self speed $v_s$ or the modified distance control signal $s_t$ to the Cruise Control Unit 10 depending on whether the tracking mode is selected or disabled, respectively.

When the tracking mode is active, the modified control signal which is fed to the Cruise Control Unit 10 controls the speed of the vehicle to coincide with the speed of the vehicle in front and, slowly, correct any inter-vehicle distance errors.

Figure 4:
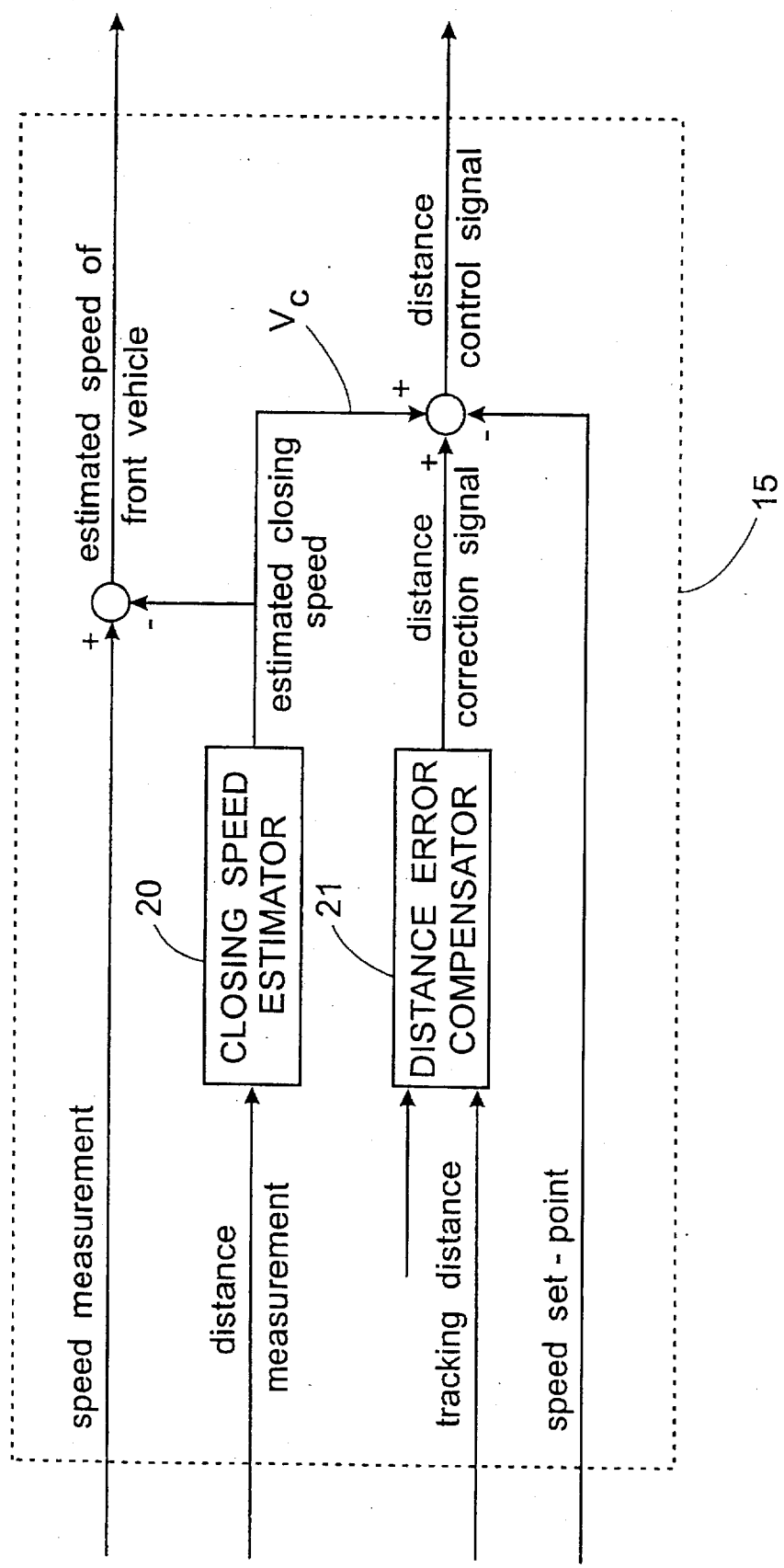
FIGS. 4 and 5 are block diagrams showing different arrangements for implementing the Tracking Command Generator illustrated in FIG. 3.

FIG. 4 shows schematically the control logic associated with the Tracking Command Generator 15. Thus, there is provided a closing speed estimator 20 operational in accordance with the logic shown in FIG. 2 of the drawings for determining the inter-vehicle closing speed $v_c$ and a distance error compensator 21 responsive to the difference between the measured inter-vehicle distance s and the desired tracking distance for computing a distance-dependent speed correction signal which is added to the estimated closing speed $v_c$ and from which there is subtracted the set-point speed so as to generate a distance-dependent speed control signal which is fed to the Cruise Control Unit 10.

Figure 5:
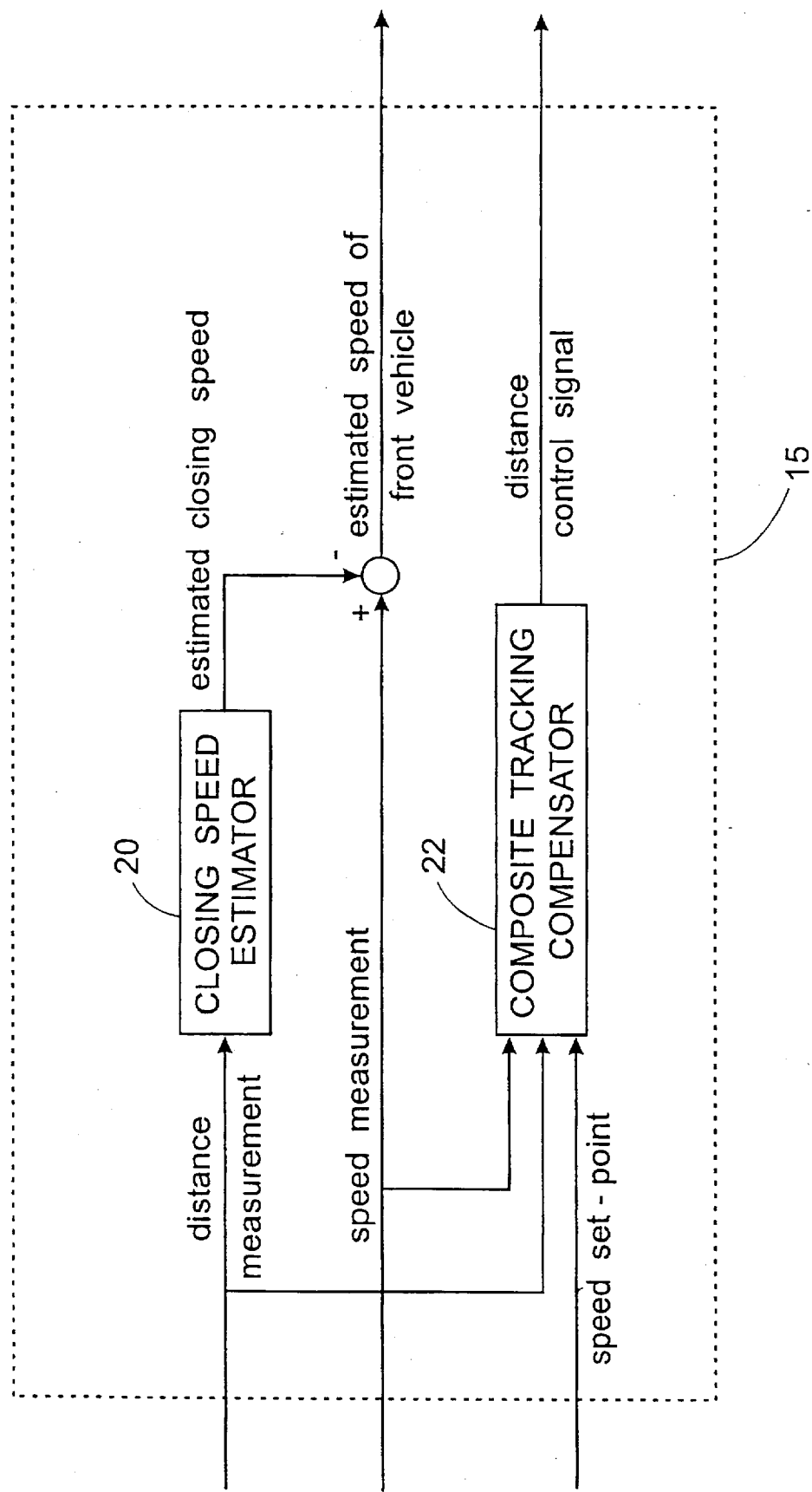

FIG. 5 shows schematically an alternative and more general arrangement for controlling the Tracking Command Generator 15. In such an arrangement, there is provided a Closing Speed Estimator 20 operational in accordance with the logic shown in FIG. 2 and a Composite Tracking Compensator 22 which is responsive to the measured inter-vehicle distance s and to the measured self speed $v_s$ for determining a distance-dependent speed control signal which is fed to the Cruise Control Unit 10.

Under typical highway-driving conditions, there is the possibility of abrupt distance-measurement signal changes. These can occur for any of the following reasons:

(1) a vehicle entering in the driving lane behind the followed front vehicle, in which case a sudden drop in the measured inter-vehicle distance occurs;

(2) the followed front vehicle leaves the driving lane, causing a sudden increase in the inter-vehicle distance signal;

(3) the vehicle enters a curve and the vehicle in front moves out of view of the RangeFinder 13; and (4) the vehicle itself changes its driving lane.

Special provision is made in the Converter Unit 12 for such abrupt distance-measurement signal changes. Specifically, if the change is an increase in distance beyond the upper threshold of the tracking range, then the existing self speed of the vehicle is maintained for a pre-set interval of time. If, within this interval of time, the inter-vehicle distance measurement returns to within the range, then the tracking mode is automatically restored. Otherwise, the vehicle returns to the cruising mode. Provision is made to restore the tracking mode by re-initializing it (i.e. pressing the mode select switch 14) or to remain in the cruising mode. In all cases, activation of the brake or depression of the clutch disengages the cruise control.

Further modifications to the Converter 11 include rendering the speed control signal further dependent on ambient conditions, so as to provide additional safety. For example, the speed control signal can be adjusted for fog or rain so that in such adverse conditions, the Cruise Control Unit 10 maintains a larger inter-vehicle distance in the tracking mode.

False readings are liable to be provided by the rangefinder 13 if its signal source is deflected by a stationary object other than the front vehicle, e.g. a wall. Likewise, if the front vehicle suddenly changes lane, the resultant signal loss may cause problems. Preferably, in such conditions, the Converter Unit 12 is adapted to maintain the current speed temporarily until a proper signal is detected.

Additional compensation may be provided by measuring the turning angle of the vehicle so as to determine when the rangefinder signal is directed towards a vehicle in a different lane.

It is also envisaged within the scope of the invention that speed limit signals may be transmitted to the Converter Unit 12 by roadside transmitters so that, even if the inter-vehicle distance permits otherwise and the Cruise Control Unit 10 were activated in a zone having a higher speed limit, the vehicle speed will nevertheless be maintained within the permitted speed limit.

We claim:

1. For use with an off-the-shelf constant speed vehicle cruise control system, comprising:

self speed setting means for specifying the required set speed of the vehicle, self speed determination means for determining a self speed of the vehicle and generating a corresponding self speed signal, and speed adjustment means coupled to the self speed determination means and responsive to the self speed signal for maintaining the self speed of the vehicle at the required set speed;

a self-contained converter for intercepting the self speed signal of the cruise control system and for converting the cruise control system to a constant distance system without requiring modification to the cruise control system, the converter comprising:

a rangefinder for determining a distance of said vehicle from a front vehicle and generating a corresponding distance signal, and a synthetic-speed signal generation means coupled to the rangefinder and to the self speed determination means for determining a required set speed for maintaining a predetermined speed-dependent distance between the two vehicles and generating a corresponding synthetic-speed signal, and a selector means having first and second inputs respectively connected to the self speed signal and the synthetic-speed signal and having an output connected to the speed adjustment means of the cruise control system, for selectively coupling one of said inputs to said output.

2. The converter according to claim 1, wherein:

there are further provided a mode select means for manually selecting a tracking mode of operation and producing a corresponding tracking signal, and a distance setting means for setting a required inter-vehicle distance, and the selector means is coupled to the mode select means and is responsive to the tracking signal for maintaining the distance between the two vehicles substantially equal to the required distance.

3. The converter according to claim 2, wherein:

the distance setting means is coupled to the mode select means and is responsive to the tracking signal produced thereby for setting the required inter-vehicle distance to the inter-vehicle distance when the mode select means is operated.

4. The converter according to claim 1, wherein the predetermined distance between the two vehicles is a function of said self speed.

5. The converter according to claim 4, wherein the predetermined distance between the two vehicles is also a function of ambient driving conditions.

6. The converter according to claim 1, further including:

an override means coupled to the rangefinder for comparing the distance signal with an upper threshold and generating an override signal if the distance signal is higher than the upper threshold, said selector means being coupled to the override means and responsive to the override signal produced thereby for connecting the output thereof to the first input.

7. The converter according to claim 6, wherein the upper threshold is transmitted remotely to the converter.

8. The converter according to claim 1, further including:
a disabling means coupled to the rangefinder for comparing the distance signal with a lower threshold and generating a disabling signal if the distance signal is lower than the lower threshold,
the cruise control system being coupled to the disabling means and being responsive to the disabling signal produced thereby for deactivating the speed adjustment means.

9. A converter for use with a vehicle cruise control system comprising self speed setting means for specifying the required set speed of the vehicle, self speed determination means for determining a self speed of the vehicle and generating a corresponding self speed signal, and speed adjustment means coupled to the self speed determination means and responsive to the self speed signal for maintaining the self speed of the vehicle at the required set speed; the converter for converting the control system to a constant distance system, said converter comprising:

a rangefinder for determining a distance of said vehicle from a front vehicle and generating a corresponding distance signal, distance-dependent speed adjustment means coupled to the rangefinder and to the self speed determination means for determining a required set speed for maintaining a predetermined distance between the two vehicles and generating a corresponding synthetic-speed signal, a selector means having first and second inputs respectively connected to the self speed signal and the synthetic-speed signal and having an output connected to the speed adjustment means of the cruise control system, for selectively coupling one of said inputs to said output, front speed determination means coupled to the rangefinder and to the self speed determination means and responsive to the distance signal and to the self speed signal for determining the front speed of the front vehicle, and comparator means coupled to the self speed setting means and to the front speed determination means for producing a tracking signal if the set speed exceeds the front speed and for producing a cruise control signal if the front speed exceeds the set speed, the selector means being coupled to the comparator means and being responsive to the cruise control signal and to the tracking signal generated thereby for connecting the first and second input to the output, respectively.

10. The converter according to claim 9, wherein the front speed determination means includes:

closing speed determination means coupled to the rangefinder and responsive to the distance signal for determining the closing speed of the vehicle to the front vehicle, and difference means for determining a difference between the self speed of the vehicle and said closing speed.

* * * * *